United States Patent Office 3,655,599
Patented Apr. 11, 1972

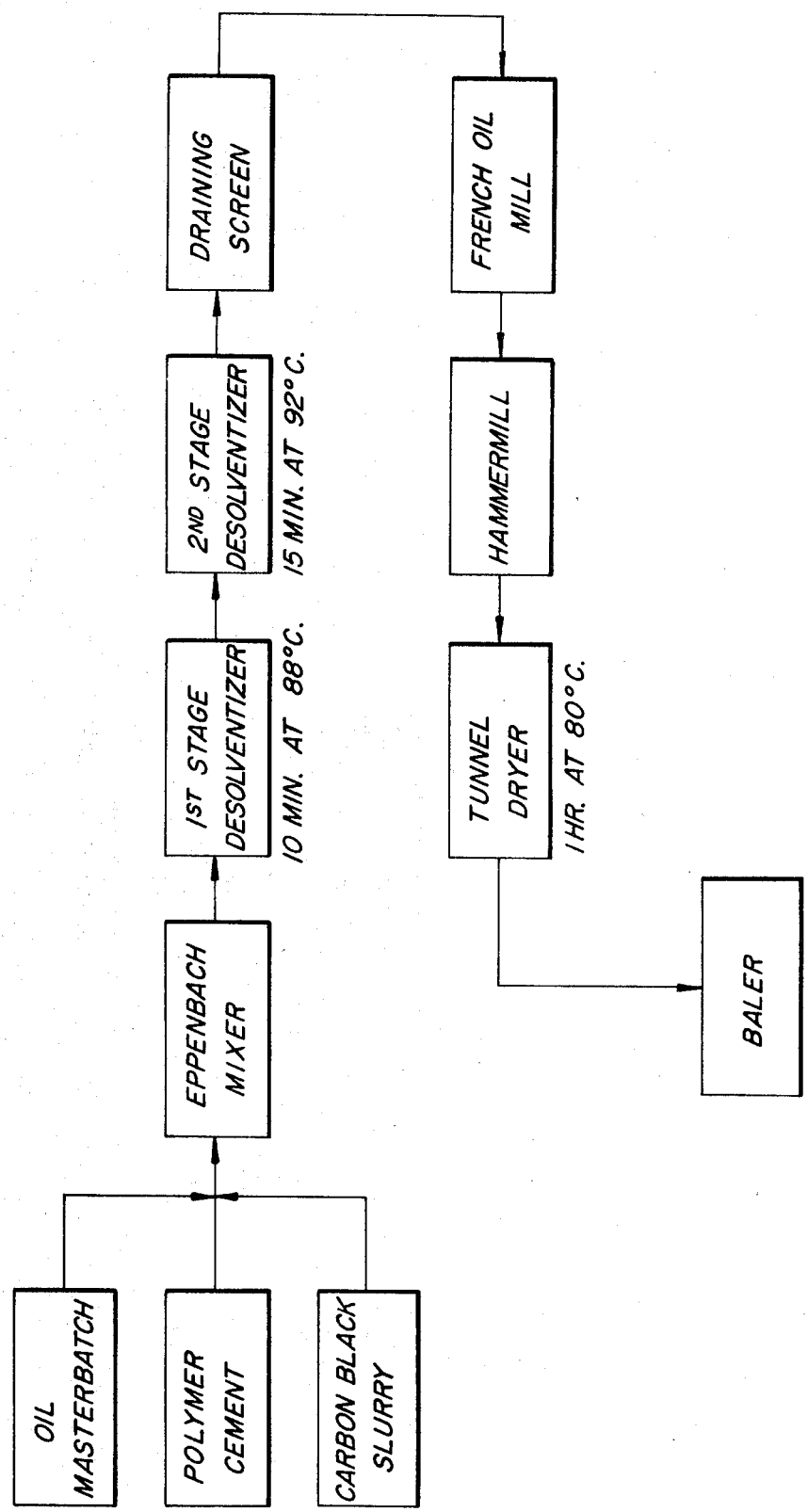

---

3,655,599
RUBBER ACCELERATORS FOR LIQUID COMPOUNDING
Edward L. Kay and Joseph A. Beckman, Akron, Ohio, assignors to The Firestone Tire & Rubber Company, Akron, Ohio
No Drawing. Filed May 18, 1970, Ser. No. 38,283
Int. Cl. C08c 9/00, 11/54
U.S. Cl. 260—23.7 M   6 Claims

ABSTRACT OF THE DISCLOSURE

Bis(2 - alkylamino-4-dialkylamino-6-triazinyl) disulfide and 2-diethylamino - 4 - amino - 6 - cyclohexylaminothiotriazine and the like are accelerators used in the liquid compounding of a rubber polymer derived at least in part from a diene.

---

The invention relates to accelerators for use in the liquid compounding of rubber polymers derived at least in part from a diene.

Benzothiazole sulfenamide-type accelerators have been used for the liquid compounding of polymers, but they suffer severe degradation during the desolventization and drying steps, probably due to hydrolysis. The resulting polymer stocks are very scorchy and after curing have poor physical properties.

The accelerators of this invention contain the s-triazine nucleus. They have been found to be inherently more stable to hydrolysis than the benzothiazole sulfenamides under the stringent conditions which prevail in liquid compounding. Such accelerators include particularly

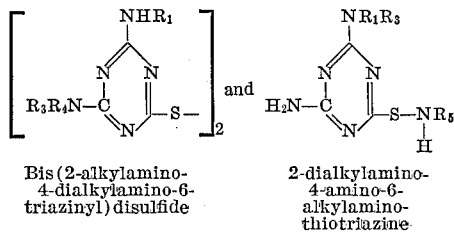

Bis(2-alkylamino-4-dialkylamino-6-triazinyl) disulfide 2-dialkylamino-4-amino-6-alkylaminothiotriazine In the foregoing formulae, $R_1$, $R_2$, $R_3$ and $R_4$ may be straight or branched chain alkyl groups of 1 to 8 carbon atoms, cycloalkyl groups of 4 to 6 carbon atoms, phenyl, benzyl or tolyl. In the second of these formulae, $R_5$ may be straight or branched chain alkyl groups of 1 to 8 carbon atoms or cycloalkyl groups of 4 to 6 carbon atoms. Representative compounds are:

Bis-2-methylamino-4-dimethylamino-6-triazinyl disulfide
Bis-2-ethylamino-4-diethylamino-6-triazinyl disulfide
Bis-2-dimethylamino-4-ethylamino-6-triazinyl disulfide
Bis-2-amino-4-amino-6-triazinyl disulfide
Bis-2-cyclohexylamino-4-dicyclohexylamino-6-triazinyl disulfide
Bis-2-(2-hexyl)amino-4-di-2-hexylamino-6-triazinyl disulfide
Bis-2-phenylamino-4-ditolylamino-6-triazinyl disulfide
Bis-2-dinaphthylamino-4-dibenzylamino-6-triazinyl disulfide
Bis-2-methylamino-4-phenylamino-6-triazinyl disulfide
2-dimethylamino-4-dimethylamino-6-methylaminothiotriazine
2-ethylamino-4-ethylamino-6-diethylaminothiotriazine
2-diethylamino-4-diethylamino-6-cyclohexylaminothiotriazine
2-dicyclohexyl-4-dicyclohexyl-6-methylaminothiotriazine
2-di-(2-octyl)amino-4-di(2-octyl)amino-6-(2-octyl)aminothiotriazine
2-diphenylamino-4-methylamino-6-cyclohexylaminothiotriazine
2-methylamino-4-dicyclohexylamino-6-(n-hexyl)aminothiotriazine
2-cyclohexylamino-4-(2-octylamino)-6-di-(n-butyl)aminothiotriazine More generally the invention relates to the use of bis(2-ethylamino-4-diethylamino-6-triazinyl)disulfide and 2-diethylamino - 4 - amino-6-cyclohexylaminothiotriazine in liquid compounding.

In liquid compounding, the rubber polymer is used in the cement obtained as a product of the polymerization. (By "cement" reference is made to a solution of a rubber in an organic solvent.) One or more of the compounding ingredients, usually carbon black, is used in an aqueous slurry. The cement and the aqueous slurry are combined, perhaps with other solutions or aqueous dispersions or the like, to mix all of the desired compounding ingredients with the polymer. After thorough mixing, the solvent and water are removed and the compounded polymer is dried. Usually heat is applied at several stages in the preparation of the dried polymer, during which the polymer is heated for a substantial length of time at a temperature of at least 75° C. Conventional mercaptobenzothiazole sulfenamides are subject to hydrolytic degradation when used in such processes, producing scorchy stocks with unacceptable physical properties.

The rubber polymers to which the process is applicable are those derived at least in part from dienes which contain 4 to 6 carbon atoms including homopolymers and copolymers thereof, and copolymers of one or more such dienes with styrene or other vinyl monomer, e.g. alpha methyl styrene, styrene polymer, etc., including polybutadienes, polyisoprenes and copolymers of butadiene and isoprene (including the stereoregular polymers of higher and lower cis-1,4 content) and the copolymers of styrene or other vinyl monomer with butadiene or isoprene or both butadiene and styrene in which the ratio of the vinyl monomer to the diene may vary from 10/90 to 35/65.

The invention is further described in connection with the accompanying drawing which is a flow sheet of the steps in a liquid compounding operation, illustrative of the invention. The invention is described in connection with the treatment of a butadiene-styrene copolymer (77:23) in which there is substantially uniform sequence distribution of the styrene throughout the polymer chain, such as made by adding butadiene incrementally to a catalyzed solution of styrene. Such copolymers are substantially free of block styrene.

The process may be carried out on a batch basis or preferably on a continuous basis, as illustrated in the drawing.

The product of the copolymerization which is a cement with variable polymer content, may have compounding ingredients added to it. In the example, these are added to the Oil Masterbatch. The oil is of the type generally used in such rubbers. The composition of this masterbatch may, for example, comprise the following in which the amounts are expressed as parts by weight per 100 parts of the polymer:

OIL MASTERBATCH

| | Parts by wt. |
|---|---|
| Oil | 50 |
| Accelerator | 1.4–2.0 |
| Antioxidant | 1.0 |
| Stearic acid | 2.0 |
| Sulfur | 2.0 |
| Zinc oxide | 2.5 |

The antioxidant is for stabilization of the rubber vulcanizate.

The polymer cement of the drawing contains the stabilized polymer. Any of the available polymer stabilizers may be used. The solvent content may vary substantially. For an example, the composition of the cement is given as

| | Parts by wt. |
|---|---|
| Polymer | 100 |
| Stabilizer | 1 |
| Hexane | 650 |

The carbon black slurry is merely an aqueous suspension of the black, the following being illustrative:

| | Parts by wt. |
|---|---|
| Carbon black | 20 |
| Water | 100 |

To illustrate: The three components of the liquid compound, as given above, are mixed in the following proportions; the polymer and carbon black concentrations are expressed as weight percent, and the total parts by weight of oil is given:

| | Parts by wt. |
|---|---|
| Cement containing 15% polymer | 667 |
| Carbon black slurry containing 20% black | 65 |
| Oil masterbatch containing 50 parts oil | 60 |

The three original components are thoroughly mixed in suitable apparatus. An Eppenbach mixer is suggested in the drawing. The solvent is then removed by passing the cement into a two-stage desolventizer. The drawing suggests treatment at 88° C. for 10 minutes in the first stage, and then further treatment in the second stage for 15 minutes at 92° C. It is then suggested that the remaining material be passed over a draining screen to remove water incorporated in the polymer which is present as a crumb. It is suggested that it then be treated in a French oil mill to further remove water not removed on the screen. It is proposed that this be followed by treatment in a hammer mill to obtain small crumb which facilitates drying in the tunnel. It is eventually dried in suitable equipment, it being suggested that this be a drying tunnel where it is heated for one hour or thereabout at 80° C. The dried polymer is then baled or otherwise treated for storage or any suitable use.

The new accelerators were tested by a laboratory procedure simulating the proposed commercial process. The polymer used was butadiene-styrene copolymer (77:23) prepared in hexane by a process such as described in which the butadiene is added incrementally to the styrene, using n-butyllithium as catalyst, to yield a copolymer substantially free from block styrene, in which the styrene was substantially evenly distributed along the polymer chain. A sample of the polymer was blended with 2 phr. (parts by weight per hundred parts of polymer) of sulfur and other samples were blended with 1.4 phr. of other accelerators for comparison. These samples were tested for Mooney scorch at 265° F. with the following results:

| Stabilizer used in test | Mooney scorch at 265° F. | |
|---|---|---|
| | $T_1$ | $T_{10}$ |
| In Banbury mixed control: Santocure NS [1] | 27 | 36 |
| In Liquid compound: | | |
| Santocure NS [1] | 18 | 32 |
| Accelerator A [2] | 23 | 29 |
| Accelerator B [3] | 36 | 40+ |

[1] N-tert-butyl-2-benzothiazolesulfenamide.
[2] Bis(2-ethylamino-4-diethylamino-6-triazinyl)disulfide.
[3] 2-diethylamino-4-amino-6-cyclohexylaminothiotriazine.

The above $T_1$ value on the liquid compounded sulfenamide test is below the acceptable scorch limits. The higher values for accelerators A and B are quite satisfactory.

The use of accelerators A and B has given stocks with acceptable scorch protection and acceptable physical properties for tire treads, etc. Presumably the better results with accelerators A and B are due to their greater hydrolytic stability.

We claim:

1. In the liquid compounding of a rubber polymer of the class consisting of homopolymers and copolymers of conjugated dienes containing 4 to 6 carbon atoms and copolymers of one or more of said dienes with a vinyl monomer, by mixing an aqueous preparation of a compounding ingredient with cement of the polymer in a water-immiscible solvent, and an oil masterbatch containing an accelerator, and thereafter removing solvent from the mixture and drying the mixture by heating to at least 75° C.; the improvement which comprises employing as the accelerator a compound of the class consisting of bis(2 - alkylamino-4-dialkylamino-6-triazinyl) disulfides and 2-dialkylamino-4-amino - 6 - cyclohexylaminothiotriazines in which the alkyl groups contain 1 to 10 carbon atoms.

2. The process of claim 1 in which the solvent in the cement is hexane and the solvent is volatilized by heating at at least 88° C. for at least 25 minutes.

3. The process of claim 1 in which as a final drying step, the polymer is heated for about an hour at 80° C.

4. The process of claim 1 in which the cement is a copolymer of butadiene and styrene in hexane, the liquid compound is composed of said cement, aqueous slurry of carbon black and an oil masterbatch containing an accelerator which contains (a) oil, (b) antioxidant, (c) stearic acid, (d) sulfur and zinc oxide; and solvent is evaporated by a first treatment at substantially 88° C. for substantially 10 minutes and a second treatment at substantially 92° C. for substantially 15 minutes and subsequent drying is carried out for substantially one hour at substantially 80° C.

5. The process of claim 1 in which the accelerator is bis(2-ethylamino-4-diethylamino-6-triazinyl) disulfide.

6. The process of claim 1 in which the accelerator is 2-diethylamino-4-amino-6-cyclohexylaminothiotriazine.

References Cited

UNITED STATES PATENTS

| 3,021,226 | 2/1962 | Kraus et al. | 260—33.6 |
| 3,203,916 | 8/1965 | Voet | 260—23.7 |
| 3,203,922 | 8/1965 | Hanmer | 260—41.5 |
| 1,576,072 | 3/1926 | Shepard et al. | 260—791 |
| 2,320,819 | 6/1943 | D'Alelio et al. | 260—249.8 |
| 2,676,150 | 4/1954 | Loughran et al. | 260—249.8 |
| 3,326,912 | 6/1967 | Yamamoto et al. | 260—249.8 |

OTHER REFERENCES

Compounding Ingredients for Rubber, Cuneo Press of New England, Cambridge, Mass., 3rd edition, 1961, pp. 51 and 52.

Chemical Abstracts, vol. 64, 1966, No. 3, p. 3574a.

DONALD E. CZAJA, Primary Examiner

R. W. GRIFFIN, Assistant Examiner

U.S. Cl. X.R.

260—29.7 SQ, 33.6 AQ, 41.5 MP

UNITED STATES PATENT OFFICE
CERTIFICATE OF CORRECTION

Patent No. 3,655,599　　　　Dated April 11, 1972

Inventor(s) Edward L. Kay and Joseph A. Beckman

It is certified that error appears in the above-identified patent and that said Letters Patent are hereby corrected as shown below:

Col. 1, line 35, "$NR_1R_3$" should read --$NR_1R_2$--

Signed and sealed this 3rd day of October 1972.

(SEAL)
Attest:

EDWARD M. FLETCHER, JR.
Attesting Officer

ROBERT GOTTSCHALK
Commissioner of Patents